(12) United States Patent
Monticello et al.

(10) Patent No.: US 6,301,823 B1
(45) Date of Patent: Oct. 16, 2001

(54) SPOON FISHING LURE

(76) Inventors: Sam A. Monticello, 701 Blackman St., Lake Charles, LA (US) 70605; Briant Lloyd Smith, 5700 Laguna Cir. South, #1, South Padre Island, TX (US) 78597

( * ) Notice: Subject to any disclaimer, the term of this patent is extended or adjusted under 35 U.S.C. 154(b) by 0 days.

(21) Appl. No.: 09/588,188

(22) Filed: Jun. 7, 2000

Related U.S. Application Data

(60) Provisional application No. 60/142,455, filed on Jul. 6, 1999.

(51) Int. Cl.⁷ .................................................. A01K 85/14
(52) U.S. Cl. ........................ 43/42.5; 43/42.09; 43/42.24; 43/42.33
(58) Field of Search ................... 43/42.09, 42.24, 43/42.32, 42.33, 42.39, 42.48, 42.5

(56) References Cited

U.S. PATENT DOCUMENTS

| | | | |
|---|---|---|---|
| D. 374,266 | 10/1996 | Parks | D22/127 |
| D. 390,336 | 2/1998 | Phelps | D22/126 |
| D. 390,622 | 2/1998 | Wicht | D22/126 |
| D. 390,623 | 2/1998 | Phelps | D22/126 |
| 2,311,985 * | 2/1943 | Heddon | 43/42.33 |
| 2,517,620 * | 8/1950 | Anderson | 43/42.33 |
| 2,708,806 * | 5/1955 | Siebert | 43/42.33 |
| 2,776,518 * | 1/1957 | Felmlee | 43/42.24 |
| 3,289,345 * | 12/1966 | Reininger et al. | 43/42.09 |
| 3,429,066 | 2/1969 | McClellan | 43/42.24 |
| 3,537,207 | 11/1970 | McClellan et al. | 43/42.24 |
| 3,885,340 * | 5/1975 | Volenec | 43/42.33 |
| 4,142,319 | 3/1979 | Mihaljevic | 43/42.39 |
| 4,208,823 * | 6/1980 | Hershberger | 43/42.09 |
| 4,266,360 * | 5/1981 | Smith | 43/42.09 |
| 4,573,283 * | 3/1986 | Pippert | 43/42.09 |
| 4,637,160 * | 1/1987 | Biskup | 43/42.33 |
| 4,672,768 * | 6/1987 | Pippert | 43/42.09 |
| 4,676,020 | 6/1987 | Taylor et al. | 43/42.02 |
| 4,700,503 * | 10/1987 | Pippert | 43/42.09 |
| 4,713,906 | 12/1987 | Distaffen | 43/42.5 |
| 4,831,765 * | 5/1989 | Bradshaw | 43/42.32 |
| 4,839,983 * | 6/1989 | Pippert | 43/42.5 |
| 4,854,071 | 8/1989 | Kendall | 43/42.33 |
| 5,070,640 | 12/1991 | McGahee | 43/42.52 |
| 5,077,930 | 1/1992 | Berry | 43/42.32 |
| 5,084,996 * | 2/1992 | Woodruff et al. | 43/42.33 |
| 5,175,954 | 1/1993 | Nagumo | 43/36 |
| 5,182,875 | 2/1993 | Righetti | 43/42.24 |
| 5,381,620 | 1/1995 | Gibbs | 43/42.09 |
| 5,408,780 * | 4/1995 | Chambers, Sr. | 43/42.24 |
| 5,511,338 | 4/1996 | Costanzo | 43/42.28 |
| 5,737,867 * | 4/1998 | Tsutsumi et al. | 43/42.33 |
| 5,893,232 | 4/1999 | Horton et al. | 43/42.35 |
| 5,894,693 * | 4/1999 | Davie | 43/42.24 |
| 5,918,405 * | 7/1999 | Marusak et al. | 43/42.09 |
| 5,926,993 * | 7/1999 | Marusak et al. | 43/42.09 |
| 5,992,085 * | 11/1999 | Schultz et al. | 43/42.5 |
| 6,041,538 | 3/2000 | Roemer | 43/42.06 |
| 6,041,540 | 3/2000 | Potts | 43/42.24 |
| 6,182,391 * | 2/2001 | Hubbard | 43/42.33 |

FOREIGN PATENT DOCUMENTS

679102-B1 * 12/1991 (CH) .

* cited by examiner

*Primary Examiner*—Darren W. Ark
(74) *Attorney, Agent, or Firm*—Barnes & Thornburg

(57) ABSTRACT

This invention pertain to a new and unique spoon and the process of manufacturing them. The new type of spoon includes a pliable core encased within soft or rubber body. A pliable core allows adjustment of the shape of the spoon to provide differing wobble and swim patterns in the water. The core, which may be made of thinly drawn metal or wire, may bear visual enhancing decals; the body may be either translucent or opaque. Rings at the ends provide a place to attach tackle. Terminal tackle, such as a treble hook, may be attached at either end, thereby giving an angler a choice of two distinct riggings for the spoon; one rigging that leads with the narrow end and the other that leads with the wide end. The unique spoon and the method of manufacturing thereof creates a lure that is more attractive and acceptable to game fish.

18 Claims, 5 Drawing Sheets

SPOON FISHING LURE

RELATED APPLICATIONS

Priority is hereby requested under 35 USC 119(e) based upon U.S. Provisional Application 60/142,455, filed on Jul. 6, 1999. The aforementioned provisional application is hereby incorporated by reference.

BACKGROUND AND SUMMARY OF THE INVENTION

This invention pertains to a plastic or rubber spoon used as fishing bait. There are many types and designs of fishing lures that are known as spoons. Spoons are named so because they possess a very strong resemblance to the ordinary eating spoon; that is, most are convex on one surface and flat or concave on the other. Spoon-type fishing lures are perhaps the oldest known artificial type of bait. Indeed, there is evidence that this type of fishing lure was used by the ancient Egyptians. Clearly, the spoon type bait has passed the test of time.

Spoon-type baits are generally made from solid metal or hard plastic. Their peculiar convex shape and their specific gravity, coupled with the shiny metal finish of the lure, attracts fish because of the vibrations created as the lure undulates through selected depths in the water column. However, because the traditional spoon is formed of hard, non-pliable metal, an angler is typically unable to alter the concavity to suit a particular situation. Additionally, because a spoon is generally cast of hard, non-pliable metal, a striking fish is able to distinguish a hard spoon from an actual bait fish and may consequently attempt to spit the lure out. The hard metal feel of a spoon may deter a fish from re-striking in the event the first strike is unsuccessful.

This invention addresses the many shortcomings of the prior art spoon. For example, an angler is able to adjust the concavity or shape of the lure in order to adjust the sinking pattern or swim-wobble of the lure. Additionally, the soft coating provides a more familiar texture to a striking fish, making the lure less likely to be spit out following a strike. Moreover, in the event of an unsuccessful first strike, a striking fish is more likely to make a second attempt at striking the spoon in the event the texture of the lure more closely approximate a fish.

Additionally, the prior art spoons were traditionally solid metal and consequently much heavier than water. As a result, spoons were not commonly used in shallower water. If one wanted to use the traditional spoon in shallow water, a lightning fast retrieve was often required.

The spoon of the present invention has a much lower specific gravity; as a result, the spoon is ideal for shallow water fishing. A shallow-water angler using the spoon may use a slow, patient retrieve.

Unlike many slow-sinking shallow water baits, however, the present spoon is heavy enough to cast for distance and control. Because the soft spoon is coated with a very light yet very tough plastic or rubber its specific gravity is much less than a traditional spoon having the same weight.

Graphics or finishes of traditional metal spoons arc applied to an outer surface of the lure. Thus, the surface of the metal spoons may lose luster over time due to exposure to the elements, abrasions on the metal resulting from fish strikes or from collisions with hard bottoms, underwater structure, or the like. In contrast, this spoon has a shiny core enveloped by a very tough, yet soft plastic or rubber coating, which will protect and preserve the shiny luster of the spoon.

The coating is preferably constructed using Dow Corning Silastic T2 Tanslucent Base. In order to enhance the curing process, Dow Coming Silastic T2 Curing Agent may be added. Silastic T2 Translucent Base is a mixture of the following compounds, by weight: at least 60% Dimethyl siloxane, dimethylvinyl-terminated; between 15 and 40% trimethylated silica; between 3% and 7% dimethylvinylated and trimethylated silica; and, between 3% and 7% dimethyl, methylvinyl siloxane, dimethylvinyl-terminated. Silastic T-2 Curing Agent is a mixture of the following compounds, by weight: about 45% Dimethyl siloxane, dimethylvinyl-terminated; about 20% dimethyl, methylhydrogen siloxane; about 16% dimethylhydrogenisiloxy modified silica; about 15% dimethylvinylated and trimethylated silica; and about 3% tetramethyl tetravinyl cyclotetrasiloxane.

A visual-enhancing holographic tape may be adhered to the faces of the core. A section of reflective, holographic tape is pre-cut to the form of the core, then placed on at least one of the faces. Additionally, the tape may have a fish-scale type pattern.

The cores are treated with a sealant, then hung to dry, preferably with heat lamps. Once dry, a couple of features may be added. For example, the core may optionally comprise an eye feature. An absorbent material may optionally be adhered to the core to be used as a vessel for receipt of fish attractants. Additionally, the material may even be formed and situated to appear like a fish-eye.

Alternatively, the core may be formed of wire. In order to stabilize a wire core, a thin plate of pliable material may be attached. The eye feature and the absorbent material, as mentioned above as options, may also be optionally adhered to the thin metal plate of a wire-cored spoon.

Once the core is finished, the soft plastic or rubber coating is added by placing the core in a shaped mold, then injecting the coating material into the mold so that the coating surrounds the core, except for ends that slightly protrude.

One embodiment of the spoon has metal cores with at least three apertures therein. A pair of holes at opposing ends of the core protrude from the coating to allow for the placement of rings to receive tackle. The rings allow for the interchangeable placement of either line-attaching tackle or terminal tackle. The interchangeability will be discussed in greater detail later.

At least one additional hole may be placed on the core at locations that will be covered by the material of the core. It has been found that the material will not adhere to the core, the holographic tape, or the sealant during the curing. However, material will form a plug by curing within the hole, thereby preventing the core from sliding out of the plastic coating.

In an alternate embodiment, the metal core may be formed without interior holes. As noted, the soft plastic coating will generally not adhere to the core or the holographic tape. Without the interior holes acting as plugs, the core may be slidably removed from the coating, enabling an angler to interchange cores and coatings.

While the shape of the core will necessarily be flat, the shape of the plastic or rubber coating will preferably have a three-dimensional, impending tear drop shape. As such, one end of the soft spoon will have a narrow configuration, while the other end will be much wider. The interchangeability of the tackle allows the angler to select between a lure that swims with its wide end leading or its narrow end leading. These distinct riggings will present differing hydrodynamic characteristics for the angler.

Not only does the interchangeability of the tackle provide a set of options to the angler, the pliability of the core presents numerous possibilities for the configuration of the lure. The pliable core will hold its position in numerous configurations, as shown by the figures attached. One may create concavity or angles in the body of the present spoon that will affect the hydrodynamics of the lure as it floats, sinks, swims quickly, or is retrieved slowly. The variations in wobble or undulations can be adjusted at each cast.

This unique spoon, and the method of making the unique spoon provide an exciting addition to the world of bait and tackle. The soft spoon will truly expand the state of the art of artificial lures. Other objects, advantages and novel features of the present invention will become apparent from the following detailed description of the invention when considered in conjunction with the accompanying drawings.

DETAILED DESCRIPTION OF THE PREFERRED EMBODIMENTS

There are many types and designs of fishing lures that are known as spoons. To date, the greatest proportion of spoons are constructed from hard metal. One common criticism of hard artificial baits is that unless a fish is hooked from the initial strike onto the lure, that fish may be discouraged to strike again at the bait due to the foreign feel of the hardness of the lure. Because the claimed invention is a soft lure, tests with this prototype revealed more return strikes to the soft spoon versus that of the ordinary hard metal variety of spoon.

Figure 1:
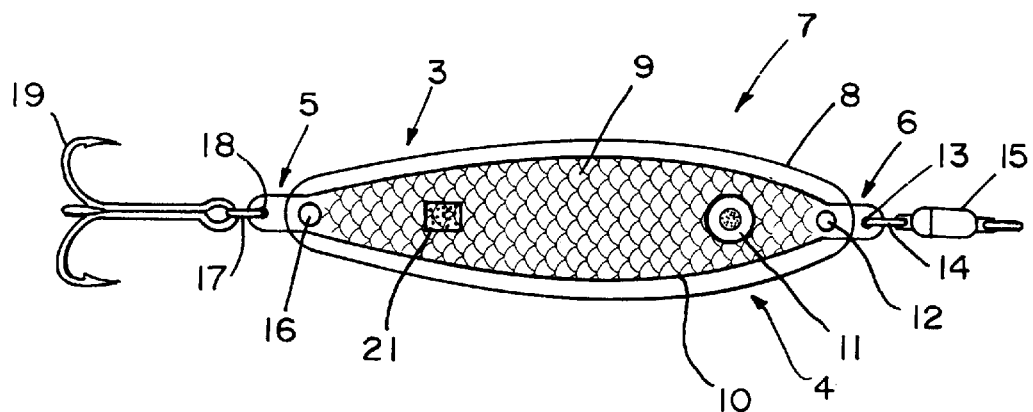
FIG. 1 is a plan view of a first embodiment of the spoon, incorporating the principles of the present invention in the minnow rig.
Figure 2:
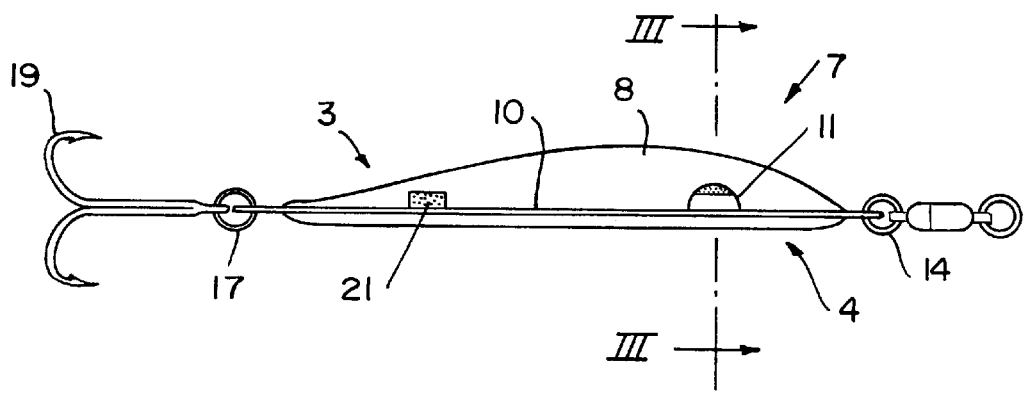
FIG. 2 is a side view of the first embodiment the spoon in the minnow rig.
Figure 8A:
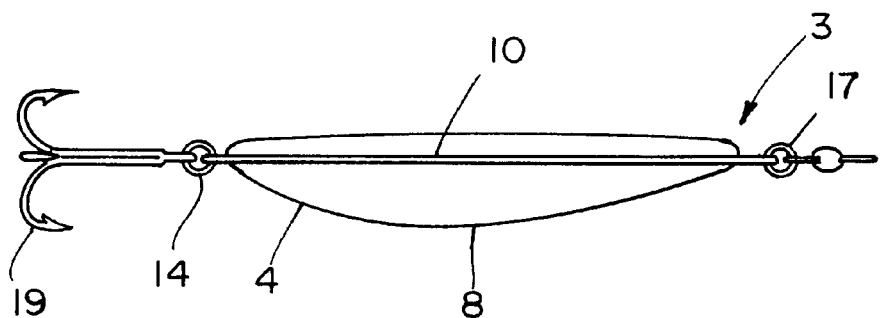
FIG. 8A is side view of the spoon in the spoon rig.
Figure 8B:
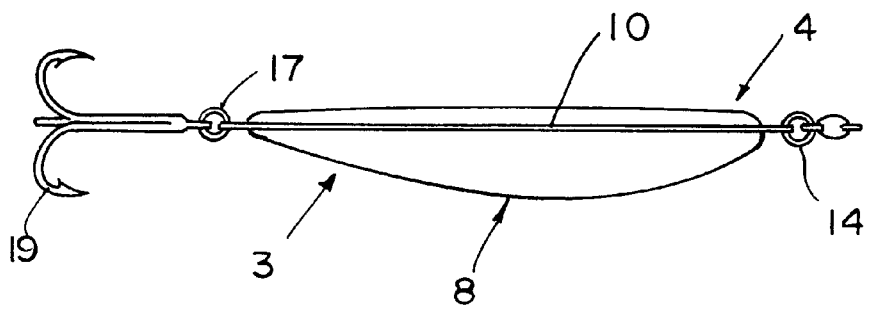
FIG. 8B is a side view of the spoon in the minnow rig.

Referring to FIG. 1, this embodiment comprises a minnow-rigged spoon 7 having a pliable core 10 enveloped by molded plastic or rubber body coating 8. Connectors 5 and 6, each containing a through hole 13 and 18, protrude from the coating 8. A connector 6 integrally formed with the core 10 protrudes from the head end 4 of the spoon 7. A ring 14 is attached through a through hole 13 in the connector 6. Similarly, the present spoon 7 also comprises a connector 5 protruding from the coating 8 at the tail end 3 of the spoon 7. The connector 5 bears a through hole 18 through which a ring 17 is attached. Terminal tackle, such as a treble hook 19, may be attached to either ring 14,17. The option of placing the terminal tackle at either end allows an angler to choose between two distinct riggings of the soft spoon. These two distinct riggings are shown in FIGS. 8A and 8B and will be discussed in greater detail hereinafter.

The core 10 is preferably of a shiny-type metal, but may also have visual enhancing holographic tape 9 adhered to at least one side thereto. Witchcraft #584FS is a preferred tape for this purpose. After applying tape 9 to the core 10, the core is treated with a sealant, then hung to dry. This drying process may be sped by using heat lamps. Once dry, a couple of features may be added.

To make the spoon 7 appear more like a bait fish, an eye 11 may be affixed to the core 10 as well. The eye may be a tape stick-on (or even made a part of the holographic tape), or it may comprise a three-dimensional object formed to look like an eye. One may even use a metallic structure (such as lead) as the eye in order to make the soft spoon heavier, if such is desired.

The present spoon 7 may have a port in the soft body that contains an absorbent material 21 which may be saturated with such a fish attractant by injecting the attractant into the material 21 from outside the soft coating 8. Additionally, the spoon 7 may be designed such that the material 21 and the eye 11 are one in the same. As such, the eye 11 may be constructed out of cloth and formed to resemble the eye of a baitfish.

Additional apertures 12,16 are formed on the core 10 at locations that will be covered by the coating 8. These apertures 12, 16 are shown situated just inside connectors 5,6 but may be provided elsewhere on the core 10 inside the coating 8. Because the soft plastic of the coating 8 does not adhere to the core 10 or the holographic tape 9, the apertures 12,16 fill with the coating 8 during the manufacture thereof to form a plug that will prevent relative movement of the coating 8 and the core 10.

FIGS. 7A–7D show another embodiment of the present spoon 30, wherein the metal core 10 may be formed without interior apertures. Because the core 10 of spoon 30 lacks holes, there will be no formation of retaining plugs inside the coating 8. Because the preferred coating will not adhere to the holographic tape 9 or the metal of the core 10, the core 10 may be removably inserted into a cavity 35 in the coating 8. A slit 36 provides an opening for the cavity 35 at the head end 4 of the coating 8. In that the tail end 3 of the coating 8 and core 10 is narrower than the head end 4, the wider, head end 4 of the cavity 35 forms a stop for the core 10. As with the other embodiments, the fully inserted core 10 will have connectors 5 and 6, each having a respective through hole 13,18 for receipt of tackle-attaching rings 14, 17.

An angler is able to interchange cores 10 and coatings 8 of spoon 30. Thus, in the event a particular color seems to be inducing an increased number of strikes, one can quickly and easily change the colored coating 8 without having to change lures altogether. Also, the reflective pattern of the core can be changed.

The molded plastic coating 8 of each embodiment of the spoon 7,20,30 should be resistant to tears and abrasions, and may be made to be either opaque or translucent. The molded plastic or rubber coating 8 may be formed of any suitable pliable rubber or plastic material. Silastic T2 Translucent Base by Dow-Corning is a preferred material for the coating 8.

Silastic T2 Translucent Base is a mixture of the following compounds, by weight: at least 60% Dimethyl siloxane, dimethylvinyl-terminated; between 15 and 40% trimethylated silica; between 3% -and 7% dimethylvinylated and trimethylated silica; and, between 3% and 7% dimethyl, methylvinyl siloxane, dimethylvinyl-termninated.

The preferred curing agent is Dow-Corning Silastic T-2 Curing Agent. Dow-Corning Silastic T-2 Curing Agent is a mixture of the following compounds, by weight: about 45% Dimethyl siloxane, dimethylvinyl-terminated; about 20% dimethyl, methylhydrogen siloxane; about 16% dimethylhydrogenisiloxy modified silica; about 15% dimethylvinylated and trimethylated silica; and about 3% tetramethyl tetravinyl cyclotetrasiloxane.

A translucent or opaque coating may be constructed of any of various types of colors. In order to further visually enhance the spoon 7,20,30, the coating 8 may be impregnated with glitter (not shown) or other vision enhancing media (not shown). In the event a translucent coating 8 is selected, the material will be slightly opaque in air, but when suspended into the water, much of the opacity vanishes, making the plastic coating nearly optically clear, thereby enhancing the color, graphics, and luster of the core.

Whether an opaque or translucent coating 8 is chosen, however, the coating 8 should have a low specific gravity. Dow-Corning RT2, is a preferred material for the coating 8; because it is very tough, pliable, and has a specific gravity very near that of water. Thus, the total specific gravity of the entire spoon 7,20,30, including the metal core 10 and the coating 8, is much lower than a metal spoon of equal weight. This difference yields two distinct advantages.

First, the low specific gravity of the spoon 7,20,30 enables the angler to use a spoon-type lure in shallower water. Traditionally, spoon fishing around grassy cover and sunken trees has not been preferred due to the high probability of snags. Even though largemouth bass often congregate in this type of shallow cover, an angler would be forced to use an alternative bait to a traditional spoon, such as a topwater plug or a weedlessly-rigged worm. This invention allows an angler to boldly go where spoon fisherman generally avoid: into dense shallow cover. In fact, it has been found that the spoon 7,20,30 is best used in the top three feet of water.

The low specific gravity of the lure provides another advantage as well. Unlike traditional lures having a low specific gravity, the spoon 7,20,30 is heavy enough for an angler to achieve a sizeable casting distance, and maintain a degree of casting accuracy, even in windier conditions, and even with heavier line. Traditionally, a fisherman seeking to present a slow-running lure at shallow depths was compelled to use a light-weight bait. All fishermen have experienced the frustration of attempting to cast a light-weight or top-water plug, only to see the breeze—even a slight one—ruin a near-perfect cast by blowing the lure away from the target.

In addition to jeopardizing casting accuracy, typical lighter-weight lures greatly reduce coverage distance due to the reduction of rod tip action during a cast. The spoon 7,20,30 addresses this problem by providing a shallow running lure that is heavy enough to cast for distance, yet light enough to stay near the water's surface.

Figure 4:
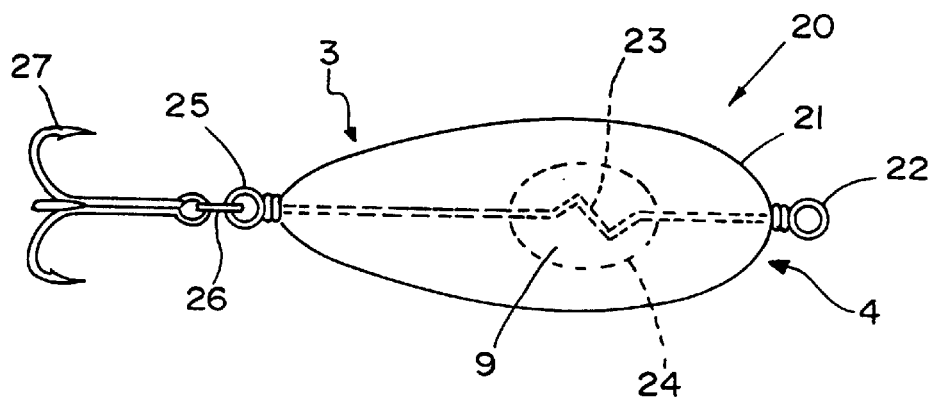
FIG. 4 is an plan view of a second embodiment of the spoon.
Figure 5:
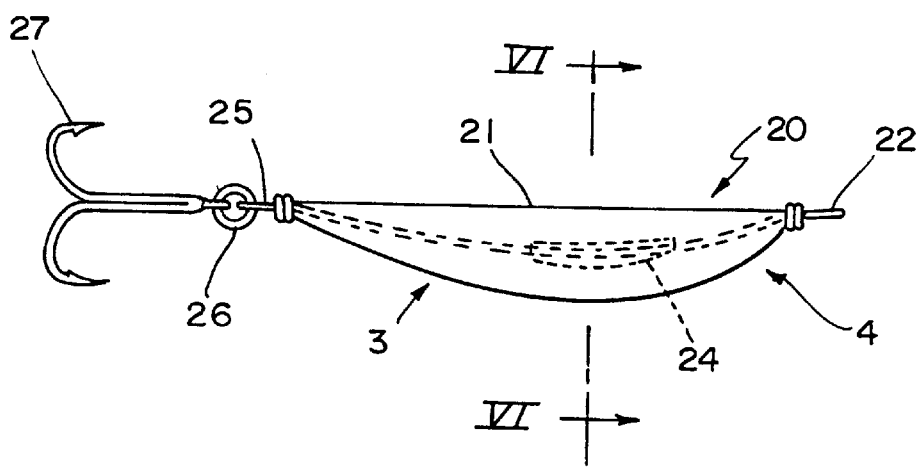
FIG. 5 is a side view of the second embodiment of the spoon.
Figure 6:
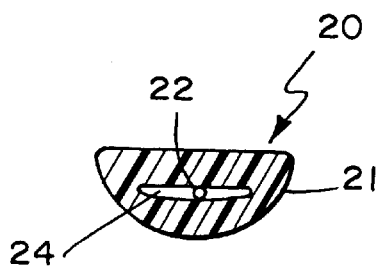
FIG. 6 cross-sectional frontal view of the second embodiment of the spoon, as viewed from plane VI—VI.
Figure 7A:
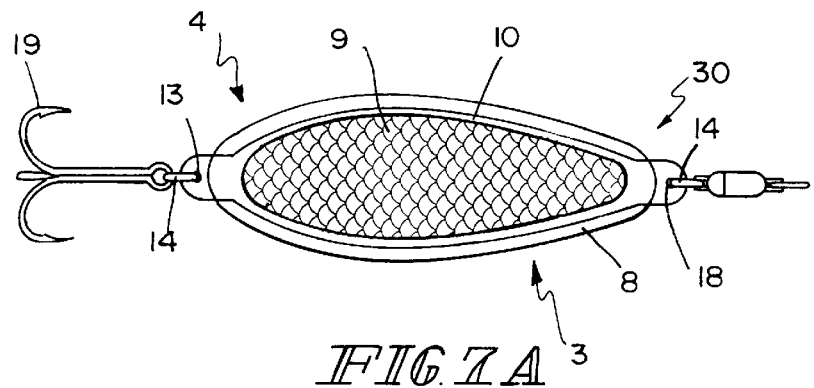
FIG. 7A is a plan view of a third embodiment of the spoon in the spoon rig.
Figure 7B:
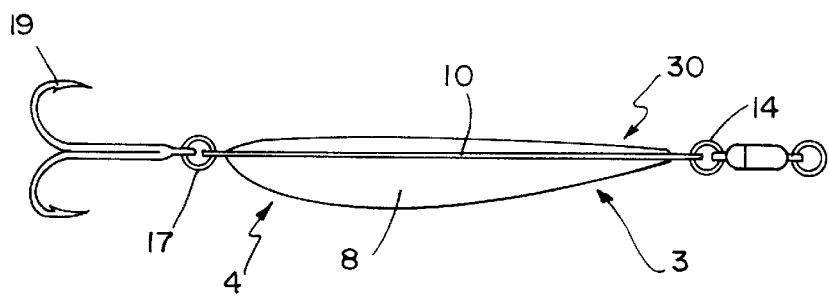
FIG. 7B is a side view of a third embodiment of the spoon in the spoon rig.
Figure 7C:
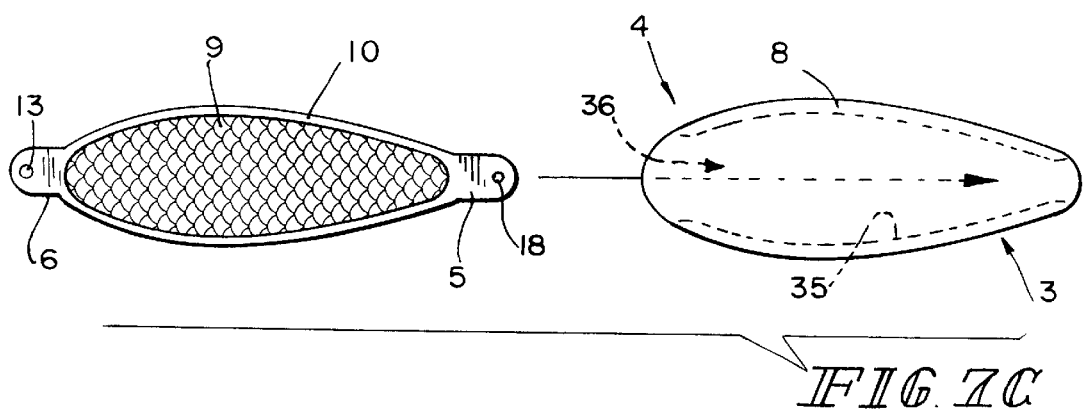
FIG. 7C is a plan view of the third embodiment of the spoon in its preassembled form.
Figure 7D:
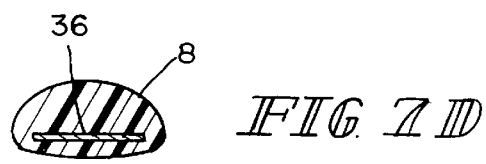
FIG. 7D is a cross-sectional view of the third embodiment.

Referring to the embodiments depicted in FIGS. 4, 5 and 6, the spoon 20 may also be constructed using a wire 23 enveloped by a molded rubber or plastic coating 21. In this embodiment, the wire 23 terminates at each end with a rings 22,25 which protrude from the plastic molded coating 21. Ring 25 provides a place for attachment of a split ring 26 which may interchangeably receive terminal tackle or line-rigging tackle. In this embodiment, the molded plastic or rubber coating 21 may also envelope a thin metal plate 24 in order to provide more stability to the spoon 20. The addition of this plate 24 would allow an angler to adjust the concavity about a longitudinal axis of the spoon 20. To clarify, the wire 23 enables the shape to be adjusted along the long axis of the spoon but not the short axis. The plate 24 within the wire-core embodiment of the spoon serves to stabilize the longitudinal axis of the spoon 20. In the wire core embodiment, visual enhancing holographic tape 9 may be adhered to the plate 24.

It is important to note that either the wire core embodiment or the sheet metal core embodiment has interchangeability of terminal tackle at the rings. The interchangeability of the tackle attached to the rings on the spoon allows one to select from a "spoon-type" configuration of FIG. 8A, wherein the narrow portion leads, or "minnow-type" configuration of FIG. 8B, wherein the wider portion leads. In these two riggings, the spoon 7,20,30 will have differing hydrodynamic behaviors during the angler's retrieve, which presents another set of options to the angler. The swim-wobble, undulations, and sink/float behavior of these two riggings are quite different.

In addition to having the option of two distinct riggings, an angler also has the option of selecting from numerous possible configurations of the spoon. The core 10 is a pliable material, preferably thinly drawn nickel, brass, nickel plated brass or stainless steel, that allows for adjustment of the shape of the spoon by adjustment of the core 10. Cores stamped from 0.018 inch thick type 304 annealed stainless steel are preferred; however, the core may be constructed from any material which is pliable and retains its adjusted shape, and further does not deteriorate when exposed to water. The adjustability of the core 10 presents an improvement over both soft-type lures and hard type lures.

An angler may opt to present a jig or minnow-type swimming lure with a spinner (not shown) attached to either ring 14,17, or a skirt (not shown) around the hook 19. The spoon 7, 20 or 30 would certainly be a desirable bait in this situation. After a while, the same angler may desire to switch to a curved, wobbly lure that creates a great deal more commotion in the water, especially if the angler moves to murkier water where visibility is lower, increasing the need to cause a stir in the water to entice a strike. Under traditional circumstances, the angler would have to either switch rods—which would of course require the availability of numerous rods at the ready—or take the time-consuming task of changing lures.

Figure 9A:
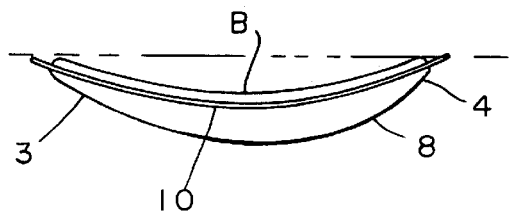
FIGS. 9A–9E provide comparative side views of various configurations attainable by the spoon.
Figure 9B:
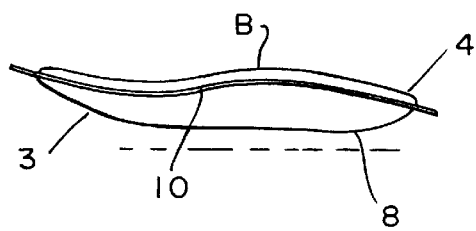
Figure 9C:
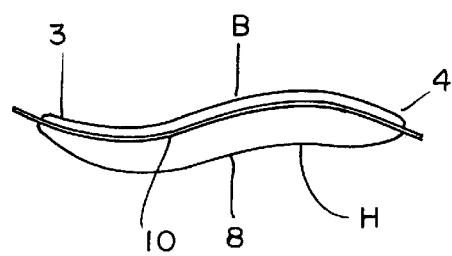

FIGS. 9A through 9E show a few examples of configurations that have proven successful in enticing strikes. FIG. 9A shows a C-shape configuration wherein the core 10 is bent concavely about the back B of the spoon. This configuration will create a sizeable air pocket along the back B of the spoon. FIG. 9B shows an S-Shape configuration, wherein the core 10 is adjusted to undulate gently to form two opposing curves, similar to an S. FIG. 9C shows a Z-Shape configuration, which is similar to the S-Shape of FIG. 9B, but the undulations of the core 10 are much more pronounced. The Z-Shape yields a hollow area H near the head end 4 of the spoon. This hollow area creates smaller air pockets to induce a distinctive wobble in the water. Experimentation has been found that the Z-Configuration of FIG. 9C has produced a number of strikes. The forming of a hollow area near the face of the present spoon provides a unique wave and wobble pattern which approximates a bait fish.

Figure 9D:
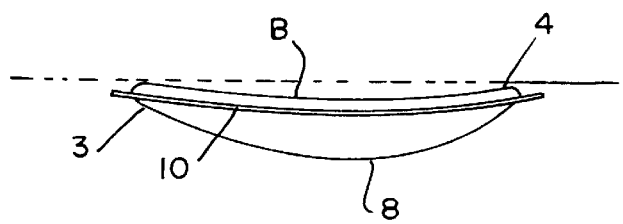
Figure 9E:
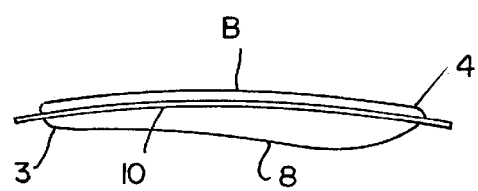

FIGS. 9D and 9E show a comparison of two single bend type configurations of the core 10. FIG. 9D shows the bow configuration, which is bent so that concavity is about the back B. FIG. 9E, however, shows the reverse bow configuration, bent convexly about the back B. It should be noted that the C-Shape configuration of FIG. 9A is one type of the bow configuration shown in FIG. 9E, but has a greater depth of concavity.

The present spoon can be manufactured to take on a number of shapes and sizes depending on an angler's preference. For example, the present spoon 7,20 or 30 may be formed in the traditional impending tear drop shape, made to mirror the appearance of traditional metal, hard spoons. Alternatively, the present spoon lure may be formed as an elliptical shape having great eccentricity. Additionally, the shape of the spoon may be altered to mimic the appearance of a bait fish. The thin metal core 10 may be formed of any size or shape inside the coating.

The method of making the present spoons requires a mold from a hard, heat stable molding material. A metal core is placed longitudinally inside the mold. Then, soft plastic or vinyl, preferably Dow-Corning RT2, is mixed to a selected proportion, heated and poured or injected into the mold, so as to encase the metal core in all dimensions and in the perimeter, with the exception of ends which should protrude from the mold.

Silastic T-2 by Dow-Corning, comprised of polydimethyl siloxane, is the preferred curing agent. In order to insure a tough, pliable coating, a curing agent is required. The present spoon's cure is greatly accelerated by heat. At room temperature, the cure will take about 24 hours. In contrast, at 120 degrees Fahrenheit, the cure time is about one hour. It is felt that a temperature of 150–200 F for about 30 minutes provides optimal results and production. Preferably, the material is held in the mold at 190 degrees Fahrenheit for thirty minutes before being allowed to naturally cool to room temperature.

Figure 3:
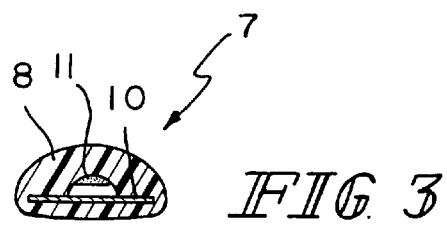
FIG. 3 is a cross-sectional front view of the first embodiment of the spoon, as viewed from plane III—III.

A mold may be selected or formed to take on a variety of shapes and configurations. For example, the present spoon may be formed to have a flat appearance, much like a traditional metal spoon, or may take on a three dimensional, impending teardrop configuration, as shown in FIGS. 3 and 6. A three dimensional appearance results in a different visual effect never seen before in a traditional spoon.

The spoon and its method of manufacture present a new and unique concept in that the disclosed spoon may be used as a top water lure, a crank bait, jig bait or as a regular spoon with spoon like action depending on how the present spoon is bent and shaped. These options present an economic advantage to a fisherman in that only one versatile bait may be able to accomplish a diverse and varied action and presentation. Additionally, the present configuration of the unique spoon would allow a fisherman to inject a fish attractant to enhance the attractiveness of the bait, whereas a traditional hard-metal spoon would not have presented this capability.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A fishing spoon comprising:

a core of pliable material;

a coating enveloping at least a portion of the core such that ends of the core remain uncoated, the coating comprising a mixture of the following compounds, by weight: at least 60% dimethyl siloxane, dimethylvinyl-terminated; between 15 and 40% trimethylated silica; between 3% and 7% dimethylvinylated and trimethylated silica; and, between 3% and 7% dimethyl, methylvinyl siloxane, dimethylvinyl-terminated;

a ring attached at one uncoated end of the ends of the core;

a ring attached at the opposite uncoated end of the core;

at least one fish hook attached to one of the rings;

wherein, the spoon retains a configuration that is selected by adjusting the core.

2. A fishing spoon comprising:

a core of pliable material;

a reflective material adhered directly to the core;

a body of a soft translucent silicone enveloping at least a portion of the core such that ends of the core remain uncoated;

the silicone being a mixture of the following compounds, by weight: at least 60% dimethyl siloxane, dimethylvinyl-terminated; between 15 and 40% trimethylated silica; between 3% and 7% dimethylvinylated and trimethylated silica; and, between 3% and 7% dimethyl, methylvinyl siloxane, dimethylvinyl-terminated;

a ring attached at one of the ends of the core, a ring attached at the opposite end of the core;

at least one fish hook attached to one of the rings;

wherein, the spoon retains a configuration that is selected by adjusting the core.

3. The spoon as in claim 2 wherein the pliable material is wire.

4. The spoon as in claim 3 further comprising a pliable thin metal plate adhered to the wire.

5. The spoon as in claim 2 wherein the pliable material is a thin, flat strip of metal.

6. The spoon as in claim 5 wherein the thin, flat strip of metal bears a generally eccentric elliptical shape wherein the rings are attached near vertices of the elliptical shape.

7. The spoon as in claim 2, wherein the reflective material includes a holographic tape adhered to at least a portion of the core in order to enhance the visibility of the spoon.

8. The spoon as in claim 2 including apertures near each end of the enveloped portion of the core such that the apertures are filled by the silicone of the body.

9. The spoon as in claim 2 wherein the core is a tear-drop shape.

10. The spoon as in claim 2, wherein the core is made of metal comprising at least one of stainless steel, nickel, nickel-coated brass, or brass.

11. The spoon as in claim 2 wherein the body is impregnated with glitter.

12. The spoon as in claim 2, wherein the at least one fish hook is a treble hook.

13. The spoon as in claim 2 further comprising an absorbent material within the body.

14. The spoon as in claim 13 wherein the absorbent material is mounted on the core.

15. The spoon as in claim 13 wherein the absorbent material includes a fish attractant therein.

16. The spoon as in claim 2 further comprising an object adhered to the core, said object configured and situated on the core to resemble an eye of a bait fish.

17. The spoon as in claim 2 wherein a cavity is formed extending from one end of the body to an opposite end of the body so that the core may be removably inserted into the cavity.

18. The spoon as in claim 2 wherein the body has a three dimensional teardrop shape with one flat surface and the core is adjacent the flat surface.

\* \* \* \* \*